United States Patent [19]

Huang

[11] Patent Number: 4,892,661
[45] Date of Patent: Jan. 9, 1990

[54] NOVEL MEMBRANE METHOD

[75] Inventor: Robert Y. M. Huang, Waterloo, Canada

[73] Assignee: University of Waterloo, Waterloo, Canada

[21] Appl. No.: 190,682

[22] Filed: May 5, 1988

[51] Int. Cl.$^4$ ............................................. B01L 13/00
[52] U.S. Cl. ................................ 210/640; 210/500.38
[58] Field of Search ................... 210/638, 651, 500.38, 210/640

[56] References Cited

U.S. PATENT DOCUMENTS

| | | | |
|---|---|---|---|
| 3,672,975 | 6/1972 | Arons | 117/118 |
| 3,720,717 | 3/1973 | Cox | 260/598 X |
| 3,773,844 | 11/1973 | Perry et al. | 260/669 A |
| 3,784,620 | 1/1974 | Perry et al. | 260/669 A |
| 3,819,742 | 6/1974 | Brun et al. | 260/681.8 R |
| 3,930,990 | 1/1976 | Brun et al. | 208/308 |
| 4,247,665 | 1/1981 | Daniels et al. | 525/421 |
| 4,547,530 | 10/1985 | McCreedy et al. | 521/139 |
| 4,590,098 | 5/1986 | Kazuse et al. | 427/244 |
| 4,707,266 | 11/1987 | Degen et al. | 210/651 X |

OTHER PUBLICATIONS

Synthetic Polymer Membranes, A Structural Perspective, (3rd Ed) R. G. Kesting (1985).
"Pervaporation Separation of Acetic Acid–Water Mixtures Using Modified Membranes. Part 1 Blended Polyacrylic Acid (PAA)-NYLON 6 Membranes"- Journal of Applied Polymer Science, Accepted for Publication, Aug. 1987.
R. Y. M. Huang et al, "Synthesis and Preparation of Thin Film Composite Membranes for the Pervaporation Separation of Acetic Acid Water Mixtures, Proceedings of the International Membrane Conference on the Anniversary of Membrane Research in Canada," Sep. 24–26, 1986, Ottawa National Research Council of Canada, pp. 313–339.
R. Y. M. Huang et al, "Novel Blended Nylon Membranes for the Pervaporation Separation of Acetic Acid–Water and Ethanol–Water Liquid Mixture Systems, Proc. of the 2nd Int. Con. on Pervaporation Process in the Chemical Industry," San Antonio, Texas USA–Mar. 1987.

Primary Examiner—Frank Spear
Attorney, Agent, or Firm—Sim & McBurney

[57] ABSTRACT

Novel blended membranes are disclosed useful for the pervaporation separation of water-acetic acid mixtures and other miscible multicomponent systems. The blended membranes are formed from polyacrylic acid and nylon 6 or from polyvinyl alcohol, polyacrylic acid and nylon 4 or 6 by blending solutions of the materials, casting the blend and cross-linking the cast membrane.

11 Claims, 2 Drawing Sheets

NOVEL MEMBRANE METHOD

FIELD OF INVENTION

The present invention relates to certain novel membrane material suitable for use in pervaporation separation of organic liquid mixtures.

BACKGROUND TO THE INVENTION

In recent years, there has been increased interest in the use of pervaporation membrane separation techniques for the selective separation of organic liquid mixtures because of its high separation efficiency and flux rates coupled with potential savings in energy costs. Representative prior art patents describing such procedures are U.S. Pat. Nos. 3,773,844, 3,784,620 and 3,819,742.

In pervaporation, the liquid mixtures feed is provided in contact with one side of a dense non-porous membrane and, after diffusing through the membrane, is removed from the downstream side in the vapour phase under vacuum or swept out in a stream of inert carrier gas and then condensed. The technique depends on the fact that certain membranes permit easier passage of one liquid than another, thereby changing the composition of the mixture by pervaporation through the perm selective membrane.

The permeability of liquids through polymer membranes may be considered as a composite term which is the product of the solubility and diffusion constants. Polymer membranes can exhibit selectivity on the basis of these two parameters, for example mixtures of liquids with different diffusion constants can be separated if their solubilities are different and vice versa. Accordingly, in a pervaporation membrane process, it is desirable to have a polymer film which combines the characteristics of high permeation flux coupled with good selectivity.

Various methods for preparing polymer membranes for various separation processes with good permeability and selectivity to inorganic and liquid mixtures have been described previously. These procedures include copolymerization, graft and block copolymerization, annealing and mechanical stretching, and the use of thin film composite membranes. In this regard, reference is made to the work "Synthetic Polymer Membranes, A Structural Perspective" (3rd Edition), by R. G. Kesting (1985), and to U.S. Pat. Nos. 3,672,975, 3,720,717, 3,930,990, 4,247,665, 4,547,530 and 4,590,098.

SUMMARY OF INVENTION

In accordance with the present invention, there is provided a novel membrane material which is based on a homogeneous blend of materials and which is useful for the pervaporation separation of acetic acid-water mixtures.

Accordingly, in one aspect of the present invention, there is provided a novel pervaporation membrane material, prepared by solution blending a mixture comprising polyacrylic acid in aqueous solution and a nylon in formic acid to form a homogeneous blend having a glass transition temperature, casting the blend into a membrane, and ionically cross-linking the membrane.

GENERAL DESCRIPTION OF INVENTION

Figure 1:
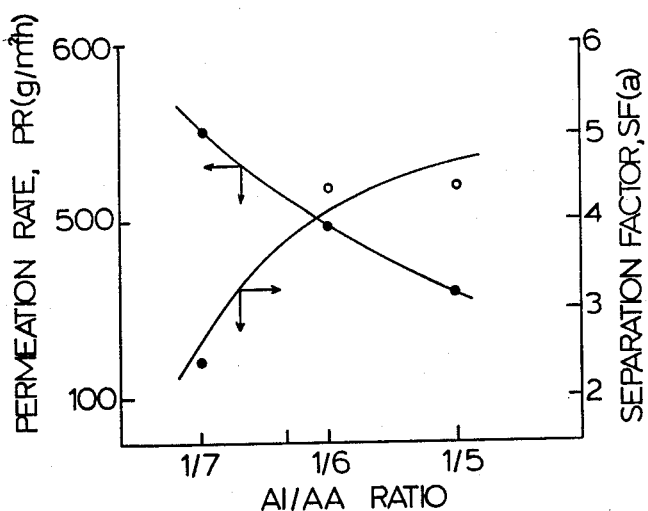
FIGS. 1 to 4 are graphical representations of pervaporation data generated using membranes provided in accordance with one embodiment of the invention, as described in the Examples below.

The novel membrane material of the present invention may be formed from blends of polyacrylic acid and a nylon alone or from blends of polyvinyl alcohol, polyacrylic acid and a nylon.

When the novel membrane material is formed from blends of polyacrylic acid and a nylon alone, the polyacrylic acid may be polymerized acrylic or methacrylic acid, usually acrylic acid, having wide molecular weight range, generally from about 50,000 to about 400,000, preferably about 100,000 to about 150,000.

The polyacrylic acid is used as an aqueous solution thereof, usually having a concentration from about 10 to about 40 wt. %, preferably about 15 to about 25 wt. %.

The nylon may be any of the polyamides classed as nylons and preferably is nylon 4 or 6. The nylon may have a wide molecular weight range, generally from about 30,000 to about 150,000, preferably about 35,000 to about 60,000.

The nylon is used as a solution thereof in formic acid, usually having a concentration from about 5 to about 20 wt. %, preferably about 10 to about 15 wt. %.

For the embodiment of the invention wherein the novel membrane material is formed from polyvinyl alcohol, polyacrylic acid and a nylon, the polyvinyl alcohol may be polymerized vinyl alcohol having a wide molecular weight range, generally from about 10,000 to about 50,000, preferably about 20,000 to about 40,000.

The polyvinyl alcohol is used as an aqueous solution thereof, usually having a concentration from about 5 to about 20 wt. %, preferably about 10 to about 15 wt. %.

The aqueous solution of polyacrylic acid, optionally the aqueous solution of polyvinyl alcohol, and the organic solvent solution of nylon are blended to form a homogeneous blend of the two solutions. The weight proportions of the solutions from which such homogeneous blends may be formed depend mainly on the relative concentrations of the solutions and may range from about 10:90 to about 45:55, preferably about 10:90 to about 30:70, for polyacrylic acid and nylon alone and from about 10:10:80 to about 15:30:65, preferably about 10:10:80 to about 10:20:70 for polyvinyl alcohol, polyacrylic acid and nylon.

The concentration of the blend for casting the membrane depends on the relative proportions of the starting materials and the concentration, and is generally about 8 to about 20 wt. %, preferably about 10 to about 15 wt. %.

The resulting blend is homogeneous and has a single glass transition temperature (Tg), generally in the range of about 71° to about 60° C., preferably about 70° to about 64° C., for polyacrylic acid and nylon alone, and about 68° to about 58° C., preferably about 66° to about 60° C. for polyvinyl alcohol, polyacrylic acid and nylon.

The blend is cast onto a suitable casting surface, usually with the assistance of a suitable casting knife to control the thickness of the membrane. The membrane generally has a thickness of about 0.025 to about 1.0 mm, preferably about 0.05 to about 0.08 mm.

The cast membrane then is dried and cross-linked. The cross-linking technique may be a wet procedure or a dry procedure. In the wet procedure, the membrane is immersed in an aqueous solution of a suitable cross-linking agent for the polyacrylic acid, preferably aluminum nitrate, and polyvinyl alcohol, if present, preferably aluminum trichloride. The concentration of the solution of cross-linking agent may vary widely, depending on the nature of the cross-linking agent and the quantity of polyacrylic acid generally about 5 to about 25 wt. %, preferably about 8 to about 15 wt. %, and the quantity of polyvinyl alcohol, if present, generally about 10 to about 25 wt. %, preferably about 10 to about 15 wt. %.

In the dry procedure, the cross-linking agent is incorporated into the homogeneous blend and cross-linking occurs during the drying step. The cross-linking agent is incorporated into the homogeneous blend in a suitable solution, for example, dimethyl formamide in the case of aluminum nitrate and formic acid in the case of aluminum trichloride.

The membranes of the present invention are useful in the pervaporation separation of acrylic acid-water, acetic acid-water and ethanol-water systems. In addition, the membranes may be used for the pervaporation separation of various alcohols/hexane or pentane liquid mixtures.

Pervaporation separation is attained using the membranes with a high separation factor coupled with high flux rates, to result in an economically-viable separation process.

EXAMPLES

EXAMPLE 1

This Example illustrates the preparation of a novel polyacrylic acid-nylon membrane according to one embodiment of the invention.

A 25% aqueous solution of polyacrylic acid having a molecular weight of 150,000 was mixed with a 75% solution of nylon 6 having a molecular weight of 42,000 to form a homogeneous blended solution.

The resulting casting solution was cast onto a glass plate with the aid of a Gardner casting knife to the desired thickness, predried at room temperature for about 5 minutes and then dried at 60° C. for 50 minutes in a drying oven.

The membrane then was cross-linked in a 10% aluminum nitrate solution cross-linking bath for about 30 hours, and then immersed in deionized water for at least 10 hours before further use.

EXAMPLE 2

This Example illustrates the use of the membrane in a pervaporation process.

The membrane formed as described in Example 1 was placed in a permeation cell, an acetic acid-water mixture was poured into the permeation cell. Vacuum was applied to the membrane and liquid permeating the membrane was collected.

Experiments were run in which the ratio of nylon to acrylic acid was varied and the permeation rate and the separation factor were determined for each variation. Further experiments were run in which the effect of temperature on the permeation rate was determined. The change of permeation rate with feed composition and different operating temperatures was also investigated.

Figure 2:
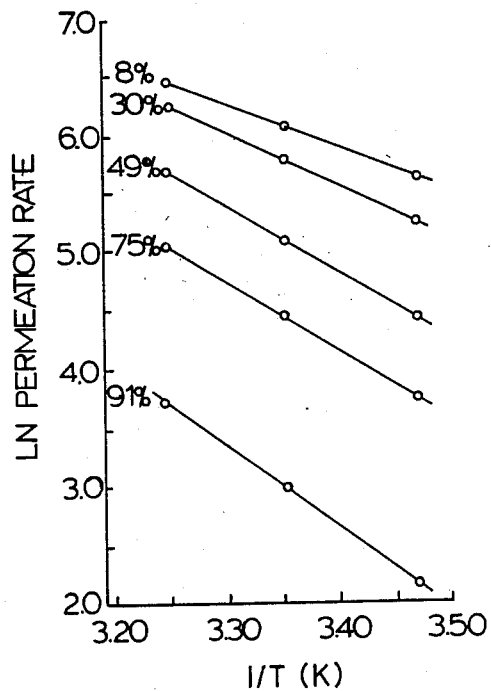
Figure 3:
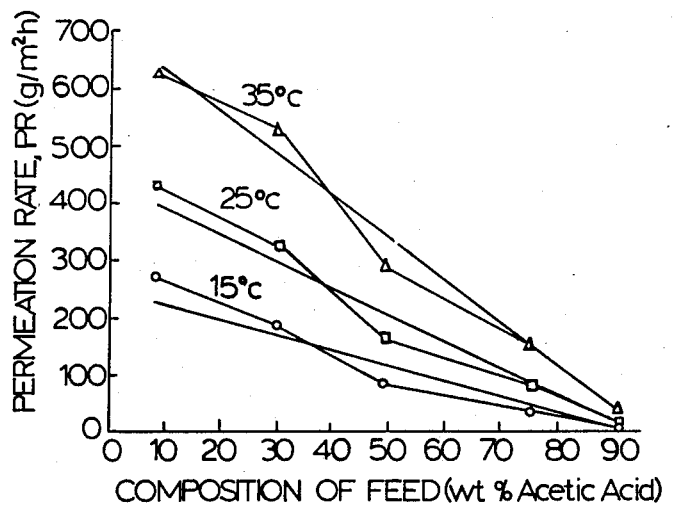
Figure 4:
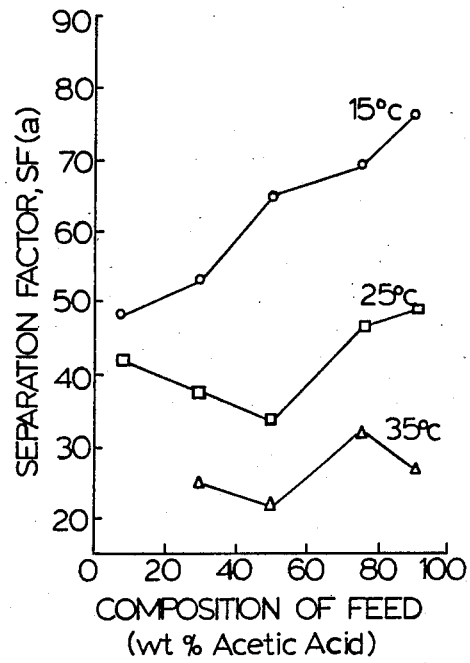

The results of these various experiments were plotted graphically and appear in FIGS. 1 to 4.

The experimental results obtained and presented in FIGS. 1 to 4 agree well with Arrehnius equation. For the range of feed concentrations, the permeation rate may be expressed in terms of straight lines which have different slopes at different temperatures.

The separation factors obtained at lower temperature were always higher than obtained under high operating temperatures.

EXAMPLE 3

This example illustrates the preparation of a novel blended polyacrylic acid (PAA)-Poly vinyl alcohol (PVA)-Nylon membrane.

PAA-PVA-Nylon 6 Membranes 25 wt. % aqueous PAA and 5 wt. % aqueous PVA solutions were blended in the ratio of 1:4 by weight for more than 24 hours. The resulting solution was further blended with Nylon 6 (10% by weight in 88% formic acid) in varying ratios. The following results were obtained:

|  | Nylon 6 Solution (10% by wt Nylon 6 in 88% HCOOH) (gm) | PAA—PVA Blend (1:4 ratio) (gm) |
|---|---|---|
| Sample #1 | 10 | 1 |
| Sample #2 | 10 | 2 |

The first two blends were cast into membranes and then ionically crosslinked. The procedure followed was identical to the preparation of 25% PAA-Nylon 6 membranes. Membrane thickness was in the range of 0.05 mm to 0.08 mm.

EXAMPLE 4

This Example illustrates the use of the PAA-PVA-Nylon 6 membranes in a pervaporation process.

The two membranes produced as described in Example 3 were placed in a permeation cell, an acetic acid-water mixture was poured into the permeation cell, vacuum was applied and the liquid permeating the membranes was collected and analyzed to obtain the separation factor. Experiments for the two blended samples #1 and #2 of Example 3 were carried out and the following experimental results for the permeation rate and the separation factor at 15°, 25° and 35° were obtained.

| Sample #1 | T = 15° |
| | Permeation Rate 500 g/m$^2$HR |
| | Separation Factor 85 |
| | T = 25° |
| | Permeation Rate 600 g/m$^2$HR |
| | Separation Factor 65 |
| | T = 35° |
| | Permeation Rate 700 g/m$^2$HR |
| | Separation Factor 50 |
| Sample #2 | T = 15° |
| | Permeation Rate 800 g/m$^2$HR |
| | Separation Factor 75 |
| | T = 25° |
| | Permeation Rate 900 g/m$^2$HR |
| | Separation Factor 60 |
| | T = 35° |
| | Permeation Rate 1000 g/m$^2$HR |
| | Separation Factor 45 |

In these PAA-PVA-Nylon 6 blends, it was observed that the addition of PVA resulted in an increase in the permeation rate although at the expense of the separation factor.

SUMMARY OF DISCLOSURE

In summary of this disclosure, the present invention provides a novel membrane for efficient pervaporation separation of miscible liquids based on blends of polyacrylic acid and nylon or of polyvinyl alcohol, polyacrylic acid and nylon. Modifications are possible within the scope of this invention.

What I claim is:

1. A novel dense non-porous pervaporation membrane material, prepared by a method which comprises:
   solution blending a mixture consisting of polyvinyl alcohol in aqueous solution, polyacrylic acid in aqueous solution and a nylon in formic acid to form a homogeneous blend having a single glass transition temperature,
   casting said blend into a membrane, and
   ionically cross-linking the membrane to provide a dense non-porous membrane material suitable for effecting pervaporation.

2. The membrane of claim 1, wherein said polyacrylic acid has a molecular weight of about 50,000 to about 400,000, said polyacrylic acid solution has a concentration of about 10 to about 40 wt. %, said nylon has a molecular weight of about 30,000 to about 150,000, said formic acid nylon solution has a concentration of about 5 to about 20 wt. %, said polyvinyl alcohol has a molecular weight of about 10,000 to about 50,000, said aqueous polyvinyl alcohol solution has a concentration of about 5 to about 20 wt. %, said homogeneous blend contains polyacrylic acid solution, polyvinyl alcohol solution and nylon solution in weight proportions of about 10:10:80 to about 15:30:65, and said homogeneous blend has a glass transition temperature of about 68 to about 58° C.

3. The membrane of claim 2, wherein said polyacrylic acid has a molecular weight of about 100,000 to about 150,000, said polyacrylic acid solution has a concentration of about 15 to about 25 wt. %, said nylon has a molecular weight of about 35,000 to about 60,000, said nylon solution has a concentration of about 10 to about 15 wt. %, said polyvinyl alcohol has a molecular weight of about 20,000 to about 40,000, said aqueous polyvinyl alcohol has a concentration of about 10 to about 15 wt. %, said homogeneous blend contains polyacrylic acid solution, polyvinyl alcohol solution and nylon solution in the weight proportions of about 10:10:80 to about 10:20:70, and said homogeneous blend has a glass transition temperature of about 66° to about 60° C.

4. The membrane of claim 1, wherein said cast membrane has a thickness of about 0.025 to about 1 mm.

5. The membrane of claim 4 wherein said cast membrane has a thickness of about 0.05 to about 0.08 mm.

6. The membrane of claim 1 wherein said cross-linking is effected by immersing the membrane in an aqueous solution of a cross-linking agent for polyacrylic acid and polyvinyl alcohol.

7. The membrane of claim 6 wherein said cross-linking agent solution has a concentration of about 5 to about 25 wt. %.

8. The membrane of claim 7 wherein said concentration is about 10 to about 15 wt. %.

9. The membrane of claim 1 wherein said cross-linking is effected by incorporating a cross-linking agent for polyacrylic acid and polyvinyl alcohol is incorporated into said homogeneous blend and cross-linking is effected during drying of cast membrane.

10. In a pervaporation process, wherein miscible organic solvent-water solutions are selectively separated into their component parts by pervaporation using a dense non-porous membrane, the improvement which comprises using a membrane as defined in claim 1 as said membrane.

11. The process of claim 10 wherein said organic solvent-water solution is an aqueous acrylic acid solution, an aqueous acetic acid solution or an aqueous ethanol solution.

* * * * *